(12) United States Patent
Azzoni et al.

(10) Patent No.: US 11,714,433 B2
(45) Date of Patent: Aug. 1, 2023

(54) PRESSURE COMPENSATION CHAMBER

(71) Applicant: FAS MEDIC S.A., Palézieux (CH)

(72) Inventors: Davide Azzoni, Meyrin (CH); Manuel Diaz, Le Lignon (CH); Teddy Blampey, Poisy (FR)

(73) Assignee: FAS MEDIC S.A., Palézieux (CH)

( * ) Notice: Subject to any disclaimer, the term of this patent is extended or adjusted under 35 U.S.C. 154(b) by 408 days.

(21) Appl. No.: 16/863,118

(22) Filed: Apr. 30, 2020

(65) Prior Publication Data
US 2020/0348703 A1 Nov. 5, 2020

(30) Foreign Application Priority Data
Apr. 30, 2019 (EP) ..................... 19172058

(51) Int. Cl.
*G05D 7/06* (2006.01)
*G01F 1/88* (2006.01)

(52) U.S. Cl.
CPC ............. *G05D 7/0635* (2013.01); *G01F 1/88* (2013.01)

(58) Field of Classification Search
CPC ...... G05D 7/0635; G05D 7/0694; G01F 1/88; G01F 5/005
See application file for complete search history.

(56) References Cited

U.S. PATENT DOCUMENTS

| | | |
|---|---|---|
| 5,161,410 A | 11/1992 | Davey et al. |
| 2003/0061888 A1* | 4/2003 | Gould ........................ G01F 1/36 73/861.52 |
| 2012/0204974 A1 | 8/2012 | Sakasegawa et al. |
| 2013/0186486 A1 | 7/2013 | Ding |

FOREIGN PATENT DOCUMENTS

| | | | |
|---|---|---|---|
| EP | 2040046 A2 | 3/2009 | |
| GB | 191312663 A * | 12/1913 | ............. G01F 5/005 |

* cited by examiner

*Primary Examiner* — Reinaldo Sanchez-Medina
*Assistant Examiner* — Nicole Gardner
(74) *Attorney, Agent, or Firm* — The Ollila Law Group LLC

(57) ABSTRACT

There is provided a fluid sensing apparatus comprising a fluid flow channel, at least one fluid conduit in fluid communication with the fluid flow channel, and a fluid sensor having a casing and at least one sensor port in fluid communication with the at least one fluid conduit and providing access into the casing. The fluid sensing apparatus also includes a pressure compensation chamber in which the casing of the fluid sensor is enclosed. The apparatus further includes at least one pressure compensation conduit in fluid communication with the pressure compensation chamber and with the fluid flow channel. Also provided is a mass flow controller including such a fluid sensing apparatus.

21 Claims, 7 Drawing Sheets

PRESSURE COMPENSATION CHAMBER

FIELD OF THE INVENTION

The present invention relates to a fluid sensing apparatus and in particular to a fluid sensing apparatus for use with a fluid control valve, such as in a mass flow controller or in a mass flow meter.

BACKGROUND TO THE INVENTION

Fluid control valves are used in a wide variety of applications to control the flow of a fluid. The fluid being controlled may comprise a gas, a liquid, or a combination thereof. In some situations, the fluid may also include suspended particulates. While fluid control valves vary widely in the specific configuration used to open and close a fluid communication path through the valve, one specific type of valve actuation is performed using a solenoid. In solenoid-actuated valves, an electric current passes through an electromagnetic coil, with the coil typically formed around a magnetic core. The coil generally comprises a wire that is wrapped around a bobbin numerous times resulting in a plurality of so-called turns. The energized solenoid generates a magnetic field. The strength of the magnetic field is proportional to the number of turns as well as the electrical current provided to the wire. As is well-known in the art, in order to increase the magnetic field provided by a solenoid, the number of turns can be increased and/or the current provided to the wire can be increased. The magnetic field typically operates on a movable armature connected to a plunger which is configured to engage a valve seat, which surrounds an inlet and/or outlet through which fluid may pass, to vary a flow restriction created by the valve seat and a sealing portion of the plunger. Other types of actuation, such as piezoelectric actuation, may be used.

Mass flow controllers ("MFCs") are widely used to measure and control the flow of a fluid. Typical MFCs include a fluid sensing apparatus, a fluid control valve, and a controller for controlling the fluid control valve. The fluid sensing apparatus generally includes a flow channel extending between an inlet and an outlet, and a fluid sensor in communication with the flow channel. During operation of the MFC, the controller determines the flow rate through the flow channel based on a sensor signal from the fluid sensor and operates the control valve accordingly to maintain the desired flow. There are two main types of MFCs; thermal-based and pressure-based.

Pressure-based MFCs typically use a flow restriction, such as a nozzle or orifice, along the flow channel to create a pressure drop from which flow rate may be determined. In such MFCs, the flow rate may be determined by physically measuring a by-passed flow created by the pressure difference, or by mathematically calculating the flow rate based on the principle that the flow rate of a fluid through a flow restriction is a function of the pressure drop across the flow restriction. By sensing the fluid pressure p1 upstream of the flow restrictive device and the fluid pressure p2 downstream of the flow restrictive device, the pressure drop can be calculated and the flow rate determined. In this or other applications, the fluid sensor may be a simple package having a casing and two or more ports through which fluid can enter and exit the casing, whereby the flow rate along the flow channel can be determined by measuring the flow rate through the sensor casing. Alternatively, the fluid sensing apparatus may have a single fluid conduit by which fluid enters a casing of the fluid sensor through a single sensor port, whereby the flow rate along the flow channel can be determined by measuring the pressure of the fluid entering the fluid sensor casing.

In each of the above types of fluid sensing apparatus, fluid passes along at least one fluid conduit from the flow channel and into the fluid sensor casing. This means that the sensor casing must be able to resist the pressure of the fluid once it has entered the sensor casing. However, fluid sensor casings have a limited capacity to resist internal pressure. For example, the casing of a typical fluid sensor may have a maximum pressure rating of around 3 bar. This means that any pressure peak of over 3 bar could cause the sensor to fail and ultimately would result in fluid leakage. To address this problem, it is known to reinforce the sensor casing to ensure that it is able to withstand the internal pressures experienced during use. However, such fluid sensors tend to be larger, heavier, and more expensive and, therefore, not appropriate for all applications, for example miniature MFCs. Increased robustness of the fluid sensor can also lead to an increase in manufacturing complexity and cost.

The present invention seeks to provide an improved flow sensing apparatus which overcomes or mitigates one or more of these problems associated with the prior art.

SUMMARY OF THE INVENTION

According to a first aspect of the present invention, there is provided a fluid sensing apparatus comprising a fluid flow channel having an inlet and an outlet, at least one fluid conduit in fluid communication with the fluid flow channel, a fluid sensor having a casing and at least one sensor port in fluid communication with the at least one fluid conduit and providing access into the casing, a pressure compensation chamber in which the casing of the fluid sensor in enclosed, and at least one pressure compensation conduit in fluid communication with the pressure compensation chamber.

With this arrangement, fluid can be supplied to the pressure compensation chamber via the at least one pressure compensation conduit so that the fluid pressure on the outside of the casing can be balanced with the fluid pressure inside the casing. Consequently, the pressure compensation chamber compensates for the internal pressure within the casing and so the casing need only resist the relatively small difference between the fluid pressure in the pressure compensation chamber and the fluid pressure in the at least one fluid conduit. This reduces the risk of leakage or sensor failure compared to sensor casings which are required to withstand the full difference between the internal fluid pressure and atmospheric pressure. The reduced burden on the casing also allows the structure and manufacture of the fluid sensor to be simplified and can facilitate the use of lighter, smaller, and less complex components. This can be particularly beneficial when the fluid sensing apparatus is intended for use in a compact device, such as a miniature MFC.

The location or locations along the fluid flow channel to which the at least one pressure compensation conduit extends may be considered as a pressure compensation location. The location or locations along the fluid flow channel to which the at least one fluid conduit extends may be considered as a fluid sensing location.

The fluid sensing apparatus of the present invention can readily be used in any number of different applications, for example to control an industrial process, to perform laboratory experiments, or for safety reasons. The fluid sensing apparatus could be used for flow rate information only, or as a means for flow regulation, such as in a device used for mass flow control or volumetric flow control. The fluid sensing apparatus of the present invention finds particular utility in accurate fluid sensing for flow control, such as in a mass flow controller. The fluid sensing apparatus of the present invention can be configured for use with a gas or a liquid.

Preferably, the at least one pressure compensation conduit is in fluid communication with the fluid flow channel and extends between the pressure compensation chamber and the fluid flow channel.

With this arrangement, fluid in the fluid flow channel during use enters the pressure compensation chamber via the at least one pressure compensation conduit and enters the casing of the fluid sensor via the at least one fluid conduit. Thus, the pressure compensation chamber is filled from fluid at the same or similar elevated pressure as the fluid flowing along the flow channel at the location of the pressure compensation conduit, while the sensor casing contains fluid at the same or similar elevated pressure as the fluid flowing along the flow channel at the location of the at least one sensor port. Consequently, the pressure compensation chamber compensates for the internal pressure within the casing and so the casing need only resist the relatively small difference between the fluid pressure at the locations of the pressure compensation conduit and the at least one fluid conduit. This reduces the risk of leakage or sensor failure compared to sensor casings which are required to withstand the difference between the elevated internal fluid pressure and atmospheric pressure. The reduced burden on the casing also allows the structure and manufacture of the fluid sensor to be simplified and can facilitate the use of lighter, smaller, and less complex components. This can be particularly beneficial when the fluid sensing apparatus is intended for use in a compact device, such as a miniature MFC.

In other embodiments, fluid may be supplied to the pressure compensation chamber via the at least one pressure compensation conduit from a fluid source other than the fluid flow channel. The at least one pressure compensation conduit may extend between the pressure compensation chamber and one or more fluid conduits which are discrete from the fluid flow channel. Where the fluid sensing apparatus comprises a housing, the housing may comprise a plurality of fluid conduits and the at least one pressure compensation conduit may extend between the pressure compensation chamber and one or more of the plurality of fluid conduits. For example, the fluid sensing apparatus may be provided as part of a manifold or a flow controller having a housing. The housing may comprise a first fluid inlet connected to the inlet of the fluid flow channel, a first fluid outlet connected to the outlet of the fluid flow channel, and a second fluid inlet, wherein the at least one pressure compensation conduit extends between the pressure compensation chamber and the second fluid inlet. In such examples, the fluid sensing apparatus may comprise a first fluid line connected to the first fluid inlet or the first fluid outlet, and a second fluid line extending between the first fluid line and the second fluid inlet. With this arrangement, fluid in the first fluid line during use enters the pressure compensation chamber via the second fluid line, the second fluid inlet, and the at least one pressure compensation conduit. Thus, the pressure compensation chamber is filled with fluid at a similar pressure to the fluid flowing along the first fluid line to compensate for the internal pressure within the casing. Additionally, this arrangement can facilitate cleaning of the fluid sensing apparatus by allowing flushing of the pressure compensation chamber via the second fluid inlet and the at least one pressure compensation conduit.

Where a single pressure compensation conduit is provided, fluid may be flushed from the chamber during cleaning via the at least one fluid conduit and the fluid flow channel. Where multiple pressure compensation conduits are provided, at least a portion of the fluid may be flushed from the chamber during cleaning via additional pressure compensation conduits. For example, the housing may comprise a first pressure compensation conduit extending between the pressure compensation chamber and the second fluid inlet and a pressure compensation conduit extending between the pressure compensation chamber and the second fluid outlet. In such examples, fluid may be flushed through the pressure compensation chamber via the first and second pressure compensation conduits.

Preferably, the fluid sensor is mounted on a printed circuit board which forms part of the pressure compensation chamber. This has been found to provide a particularly compact arrangement and avoids the need to provide separate electrical connectors extending from the fluid sensor and through the walls of the pressure compensation chamber. Such electrical connectors can be hard to seal effectively and so represent a point of potential leakage. This arrangement also has the advantage of close proximity between any control electronics on the printed circuit board and the fluid sensor to reduce noise or other disturbances to signals generated by the fluid sensor. The printed circuit board may form a wall of the pressure compensation chamber. The printed circuit board should have sufficient strength to withstand the difference between the fluid pressure within the pressure compensation chamber on its lower side and atmospheric pressure on its upper side.

Preferably, the pressure compensation chamber further comprises a receptacle against which the printed circuit board is sealed to close the receptacle and thereby define the pressure compensation chamber. With this arrangement, the printed circuit board forms an upper wall, or lid of the pressure compensation chamber.

Preferably, the fluid sensing apparatus further comprises a resilient seal between the printed circuit board and the receptacle, wherein the printed circuit board is removably sealed against the receptacle by the resilient seal. With this arrangement, the resilient seal can compensate for variations in manufacturing tolerances between the receptacle and the printed circuit board. It also allows the printed circuit board to be removed and replaced if necessary without the need to apply a separate sealant to reseal the printed circuit board against the receptacle. The resilient seal may be a rubber seal, or any other suitable elastomer, such as NBR, FPM, or EPDM. The resilient seal may sit in a groove extending around the receptacle. The resilient seal is preferably continuous. That is, the resilient seal preferably circumscribes the receptacle to form a continuous seal.

In other examples, the printed circuit board may be permanently sealed against the receptacle by a sealant which is applied after location of the printed circuit board against the receptacle.

Preferably, the fluid sensing apparatus further comprises a housing.

The at least one fluid conduit, the pressure compensation conduit, and/or the pressure compensation chamber may be formed by discrete components held within the housing. Preferably, the housing includes a solid body in which the at least one fluid conduit and the at least one pressure compensation conduit are formed. The solid body may comprise a plurality of bores by which the at least one fluid conduit and the at least one pressure compensation conduit are formed. Preferably, the receptacle is defined by a cavity in the solid body. The cavity may be defined in an outer surface of the solid body. The fluid flow channel may be formed entirely, or at least in part, by one or more of the plurality of internal bores. The plurality of internal bores are preferably formed in the solid body by a subtractive manufacturing process, such as drilling or another machining operation.

Where the fluid sensing apparatus comprises a resilient seal between the printed circuit board and the receptacle, the resilient seal may sit in a groove in the outer surface of the solid body which extends around the cavity such that the resilient seal forms a continuous seal around the cavity.

In some embodiments, the printed circuit board is a main printed circuit board on which control electronics and the fluid sensor are mounted. With this arrangement, all or substantially all of the electrical components of the fluid sensing apparatus can be provided on a single PCB.

In other embodiments, the printed circuit board is an auxiliary printed circuit board and the fluid sensing apparatus further comprises a main printed circuit board on which control electronics are mounted. The main printed circuit board may be spaced from the auxiliary printed circuit board and electrically connected to the auxiliary printed circuit board by one or more electrical connectors. With this arrangement, the main printed circuit board is at atmospheric pressure on both its upper and lower sides and, unlike the auxiliary printed circuit board, need not be reinforced to withstand the pressures in the pressure compensation chamber. This can reduce the size, weight, complexity and cost of the main circuit board. Additionally, and somewhat counter-intuitively, the provision of an auxiliary printed circuit board in addition to the main printed circuit board can reduce the overall size of the fluid sensing apparatus by reducing the space occupied by the fluid sensor on the main printed circuit board. With this arrangement, the main printed circuit board only needs to accommodate the electrical connectors for the fluid sensor, such as pins, rather than accommodating the entire fluid sensor. Other electrical components can then occupy the space on the main PCB which would otherwise be required by the fluid sensor, allowing a more compact overall arrangement. The main printed circuit board may be spaced from the auxiliary printed circuit board in a direction substantially perpendicular to the plane of the auxiliary printed circuit board. In such embodiments, the main printed circuit board and the auxiliary printed circuit board may be substantially parallel. The main printed circuit board may be spaced from the auxiliary printed circuit board in a direction substantially parallel to the plane of the auxiliary printed circuit board. In such embodiments, the main printed circuit board and the auxiliary printed circuit board may be arranged substantially perpendicular to each other.

The at least one sensor port may be flush with the at least one fluid conduit. The at least one sensor port may extend into the at least one fluid conduit. Some fluid leakage may be tolerated between the at least one sensor port and the at least one fluid conduit. Preferably, the at least one fluid conduit is isolated from the pressure compensation chamber. Preferably, the fluid sensing apparatus further comprises a sensor seal between the at least one sensor port and the at least one fluid conduit, wherein the at least one fluid conduit is isolated from the pressure compensation chamber by the sensor seal. The sensor seal may comprise an O-ring extending around the at least one sensor port and/or the at least one fluid conduit. In preferred embodiments, the at least one sensor port extends into the at least one fluid conduit and the sensor seal comprises an O-ring extending around the at least one sensor port to isolate the at least one fluid conduit from the pressure compensation chamber. The sensor seal is preferably a resilient sensor seal.

The at least one fluid conduit may comprise a single fluid conduit. The at least one sensor port may comprise a single sensor port. In such examples, the fluid sensor may be configured to measure a fluid pressure in the single fluid conduit using the single sensor port. Preferably, the at least one fluid conduit comprises a first fluid conduit extending from a first location along the fluid flow channel, and a second fluid conduit extending from a second location along the fluid flow channel. Preferably, the at least one sensor port comprises a first sensor port in fluid communication with the first fluid conduit and a second sensor port in fluid communication with the second fluid conduit.

The at least one pressure compensation conduit may comprise a plurality of pressure compensation conduits extending from different locations. For example, different locations along the fluid flow channel. The at least one pressure compensation conduit may consist of a single pressure compensation conduit. The at least one pressure compensation conduit may consist of a single pressure compensation conduit in fluid communication with the fluid flow channel. With this arrangement, the fluid flow channel is in fluid communication with the pressure compensation chamber only via the single pressure compensation conduit.

In certain preferred embodiments, the fluid flow channel comprises a flow restriction disposed between the first and second locations. The flow restriction may comprise an obstruction inserted into the fluid flow channel to create a pressure drop. The flow restriction may comprise an orifice plate or a nozzle. The flow restriction may comprise a reduction in the diameter of the outer wall of the fluid flow channel. The reduction in diameter may comprise a step change in the diameter of the outer wall. The reduction in diameter may comprise a gradual change in the diameter of the outer wall. The reduction may be provided around only part of the circumference of the fluid flow channel. The reduction may be uniform around the circumference of the fluid flow channel. Preferably, the reduction comprises a tapering of the outer wall which extends around the entire circumference of the flow channel. The fluid sensing apparatus may comprise a laminar flow element comprising a flow stabilisation rod extending along the fluid flow channel at least from the first location to the second location. In such examples, the flow restriction may comprise an increase in the diameter of the flow stabilisation rod. The increase may comprise a step change in the diameter. The increase may comprise a gradual change in the diameter. The increase may be provided around only part of the circumference of the flow stabilisation rod. The increase may be uniform around the circumference of the flow stabilisation rod. Preferably, the increase comprises a tapering of the flow stabilisation rod which extends around the entire circumference of the flow stabilisation rod. In such embodiment, the diameter of the flow channel may be constant in the region of the flow restriction so that the flow restriction is defined only by the increase in the diameter of the flow stabilisation rod. This can be beneficial in that it allows the pressure drop across the flow restriction to be varied as desired for a given throughput simply by changing the laminar flow element. The flow restriction may comprise a reduction in the diameter of the outer wall of the fluid flow channel as well as an increase in the diameter of the flow stabilisation rod.

The fluid sensor may be configured to measure a first pressure in the first fluid conduit and to measure a second first pressure in the second fluid conduit. The flow rate through the fluid flow channel can then be determined based on the pressure differential.

The first and second fluid ports may be isolated from each other within the casing. The first and second fluid ports may be in fluid communication within the casing. In some embodiments, the first fluid conduit, the sensor casing, and the second fluid conduit together form a bypass channel along which a portion of fluid flow along the fluid flow channel is diverted during use. The fluid sensor may be configured to measure a bypass flow rate through the bypass channel. The flow rate through the fluid flow channel can then be determined from the bypass flow rate through the bypass channel.

The fluid sensor may be a pressure sensor. The fluid sensor may be configured to sense a first fluid pressure at a first location along the fluid flow channel and to sense a second pressure at a second location along the fluid flow channel. The fluid sensor may be configured to sense a first fluid pressure at the first location via a first fluid conduit and to sense a second pressure in the second location via a second fluid conduit. The fluid sensor may comprise a first sensor port which is positioned in the first fluid conduit and configured to sense a first fluid pressure at the first location. The fluid sensor may comprise a second sensor port which is positioned in the second pressure conduit and configured to sense a second fluid pressure at the second location. A first sensor seal may be provided around the first sensor port to form a seal between an outer surface of the first sensor port and an inner surface of the first pressure conduit. A second seal may be provided around the second sensor port to form a seal between an outer surface of the second sensor port and an inner surface of the second pressure conduit. In this manner, fluid in the first and/or second sensor port can be prevented from bypassing the first and/or second sensor portions. Fluid in the first and second pressure conduits enters the casing of the fluid sensor via the first and second sensor portions.

The fluid sensor may be configured to output a sensor signal. The sensor signal may comprise a first fluid pressure signal and a second fluid pressure signal. The fluid sensor may be configured to calculate a pressure difference between the first and second fluid pressures. The fluid sensor may be configured to output a sensor signal comprising a pressure difference signal including a plurality of calculated pressure difference values. The fluid sensor may be configured to calculate a flow rate through the fluid flow channel based on the sensed values of first and second fluid pressure. The fluid sensor may be configured to output a sensor signal comprising a flow rate signal includes a plurality of calculated values of flow rate.

The fluid sensor may be a mass flow sensor. The fluid sensing apparatus may comprise a bypass channel configured to divert flow around a flow restriction in the fluid flow channel. The fluid sensor may be a mass flow sensor configured to measure a bypass flow rate through the bypass channel. The first fluid conduit and the second fluid conduit may be connected to form part of the bypass channel.

The fluid sensor may comprise a single sensing head. The signal from the sensing head may be amplified with different gains. This can increase the effective measuring range of flow rates that can be accurately measured by the fluid sensing apparatus and can facilitate accurate flow rate readings from the fluid sensor even at very small flow rates. The fluid sensor may comprise multiple sensing heads within a single sensor. The signals from each of the sensing heads may be amplified with different gains. This can increase the effective measuring range of flow rates that can be accurately measured by the fluid sensing apparatus and can facilitate accurate flow rate readings from the fluid sensor even at very small flow rates.

The fluid flow channel may be surrounded and defined by an outer wall of the fluid flow channel. In such embodiments, one or both of the at least one pressure compensation conduit and the at least one fluid conduit may extend through the outer wall of the fluid flow channel.

The at least one pressure compensation conduit may extend between the pressure compensation chamber and the location along the fluid flow channel such that a portion of the fluid flowing along the fluid flow channel at the location of the at least one pressure compensation conduit during use enters the pressure compensation chamber via the at least one pressure compensation conduit.

The at least one fluid conduit may extend between the at least one sensor port and the location along the fluid flow channel such that a portion of the fluid flowing along the fluid flow channel at the location of the at least one fluid conduit during use enters the casing of the fluid sensor via the at least one fluid conduit.

The pressure compensation chamber may be remote from the fluid flow channel. This means that the pressure compensation chamber is located away from the fluid flow channel. The fluid flow channel may extend adjacent to the pressure compensation chamber. The fluid flow channel may extend along the length of the pressure compensation chamber. The at least one pressure compensation conduit may form part of a separate fluid flow path to the fluid flow channel. In certain embodiments, the pressure compensation chamber does not form part of the same fluid flow path as the fluid flow channel.

The at least one pressure compensation conduit may tap into the fluid flow channel at a pressure compensation location along the length of the fluid flow channel such that fluid pressure in the pressure compensation chamber is the same as fluid pressure in the fluid flow channel at the pressure compensation location.

The at least one fluid conduit may tap into the fluid flow channel at a fluid sensing location along the length of the fluid flow channel such that fluid pressure at the at least one sensor port is the same as fluid pressure in the fluid flow channel at the fluid sensing location.

The at least one pressure compensation conduit may be configured such that a portion of the fluid flowing along the fluid flow channel at the location of the at least one pressure compensation conduit during use is diverted from the fluid flow channel to enter the pressure compensation chamber via the at least one pressure compensation conduit.

The at least one fluid conduit may be configured such that a portion of the fluid flowing along the fluid flow channel at the location of the at least one fluid conduit during use is diverted from the fluid flow channel to enter the casing of the fluid sensor via the at least one fluid conduit.

The at least one pressure compensation conduit may extend between the pressure compensation chamber and at least one pressure compensation location along the length of the fluid flow channel between the inlet and the outlet.

The at least one fluid conduit may extend between the at least one sensor port and at least one fluid sensing location along the length of the fluid flow channel between the inlet and the outlet.

The fluid sensing apparatus may be used in any suitable assembly. For example, the fluid sensing apparatus may form part of a fluid manifold.

According to a second aspect of the present invention, there is provided a mass flow controller comprising a fluid control valve, control electronics, and a fluid sensing apparatus according to the first aspect, wherein the control electronics is configured to control the fluid control valve based on a sensor signal provided by the fluid sensing apparatus. The fluid control valve may be a proportional valve.

In certain embodiments, the fluid sensing apparatus of the mass flow controller further comprises a main printed circuit board on which the control electronics are mounted, and an auxiliary printed circuit board on which the fluid sensor is mounted and which forms part of the pressure compensation chamber. The main printed circuit board may be spaced from the auxiliary printed circuit board in a direction perpendicular to the plane of the auxiliary printed circuit board and may be electrically connected to the auxiliary printed circuit board by one or more electrical connectors.

The mass flow controller may be a miniature mass flow controller. As used herein, the term "miniature mass flow controller" refers to a mass flow controller having a housing with a maximum dimension in any direction of less than 100 mm, preferably less than 80 mm. The miniature flow controller may have a maximum length of less than 80 mm and a maximum height of less than 50 mm.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

Further features and advantages of the present invention will be further described below, by way of example only, with reference to the accompanying drawings in which.

DETAILED DESCRIPTION

Figure 1:
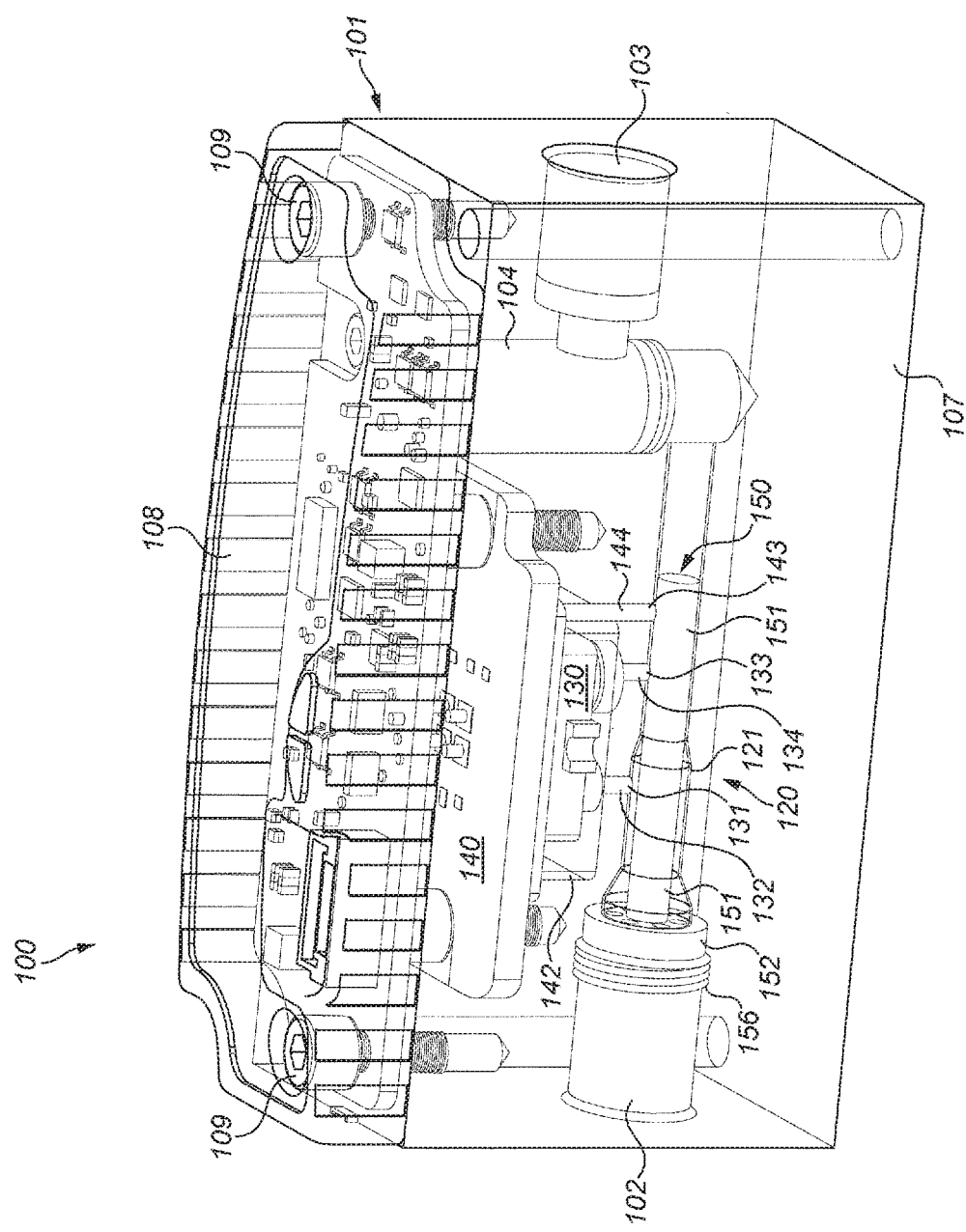
FIG. 1 is a perspective partial section view of a mass flow controller including a fluid sensing apparatus according to a first embodiment.
Figure 2:
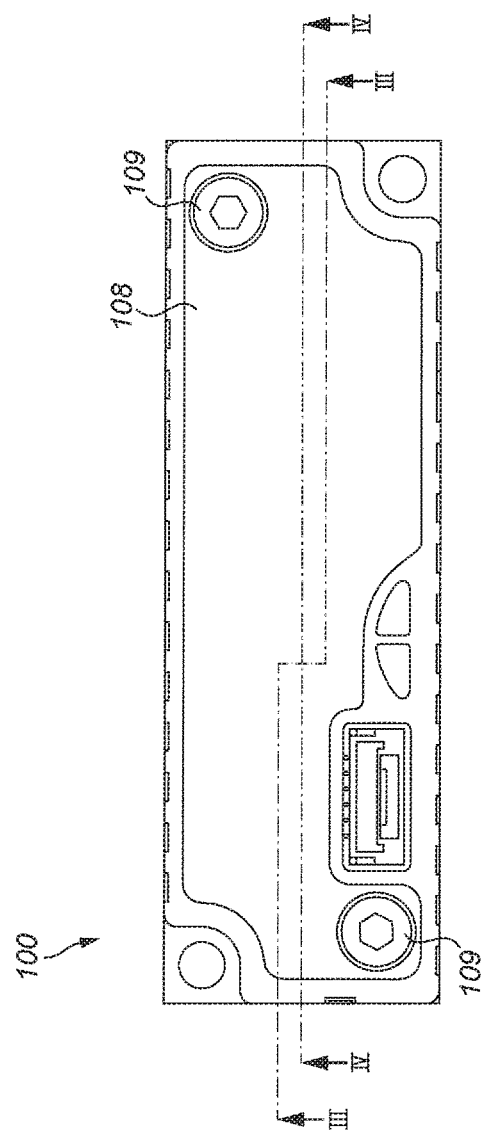
FIG. 2 is a top view of the mass flow controller of FIG. 1.

FIGS. 1 to 6 illustrate a first mass flow controller 100 including a fluid sensing apparatus 120 according to a first embodiment of the invention. The mass flow controller 100 includes a housing 101 having a fluid inlet 102 and a fluid outlet 103. The housing 101 contains a fluid control valve 104, for example a proportional valve, and control electronics 105 mounted on a main PCB 106. In this example, the housing 101 comprises a solid body 107 and a lid 108 which is removably fixed to the solid body 107 by screws 109. The fluid control valve 104 is situated along a fluid flow path extending between the fluid inlet 102 and the fluid outlet 103 and is configured to adjust the flow rate through the mass flow controller 100, based on a control signal from the control electronics 105, in order to achieve or maintain a desired flow rate. The fluid inlet 102 and the fluid outlet 103 may be threaded, as shown in FIG. 1, to allow for easy coupling to threaded connectors. Alternatively, the fluid inlet and the fluid outlet may have cartridge fittings, or have a flange mount manifold by which fluid lines are connected without the need for a threaded connection.

The fluid sensing apparatus 120 comprises a fluid flow channel 121 surrounded and defined by an outer wall 122 of the channel 121 and forming part of the fluid flow path through the mass flow controller 100. The fluid flow channel 121 extends from a channel inlet 123, which is in fluid communication with the fluid inlet 102 of the mass flow controller 100, and a channel outlet 124, which is in fluid communication with the fluid outlet 103 of the mass flow controller 100. In this example, the fluid flow channel 121 is circular in cross section, although other cross sectional shapes may be appropriate. The fluid sensing apparatus further includes a flow restriction 125 at a position along the length of the fluid flow channel 121 which is configured to generate a pressure difference in fluid flowing along the channel 121. In this example, the flow restriction 125 comprises a gradual reduction in the diameter of the outer wall 122 of the fluid flow channel 121 so that the cross-sectional area of the fluid flow channel 121 is reduced in this region and the flow velocity of the fluid increased as it passes through the flow restriction 125. This generates a pressure drop across the flow restriction 125. In other examples, the flow restriction may comprise a step change in the diameter of the outer wall, and/or a change in the diameter of the outer surface of a laminar flow element positioned in the flow channel 121, as described below.

The fluid sensing apparatus 100 further includes a fluid sensor 130 mounted on an auxiliary printed circuit board 140. The main PCB 106 is spaced apart from the auxiliary printed circuit board 140 in a direction perpendicular to the plane of the auxiliary printed circuit board 140, and is electrically connected to the auxiliary printed circuit board 140 by electrical connectors 141. The main printed circuit board 106 is removably mounted on the solid body 107 by the same screws 109 as the lid 108. The main printed circuit board 106 may be considered as the "main" PCB, since it supports the control electronics 105 of the mass flow controller 100. The auxiliary printed circuit board 140 on which the fluid sensor 130 is mounted may be considered as an "auxiliary" PCB. In other examples, such as the embodiment discussed below in relation to FIG. 7, the mass flow controller may comprise a single PCB on which both the control electronics 105 and the fluid sensor 130 are mounted directly.

Figure 6:
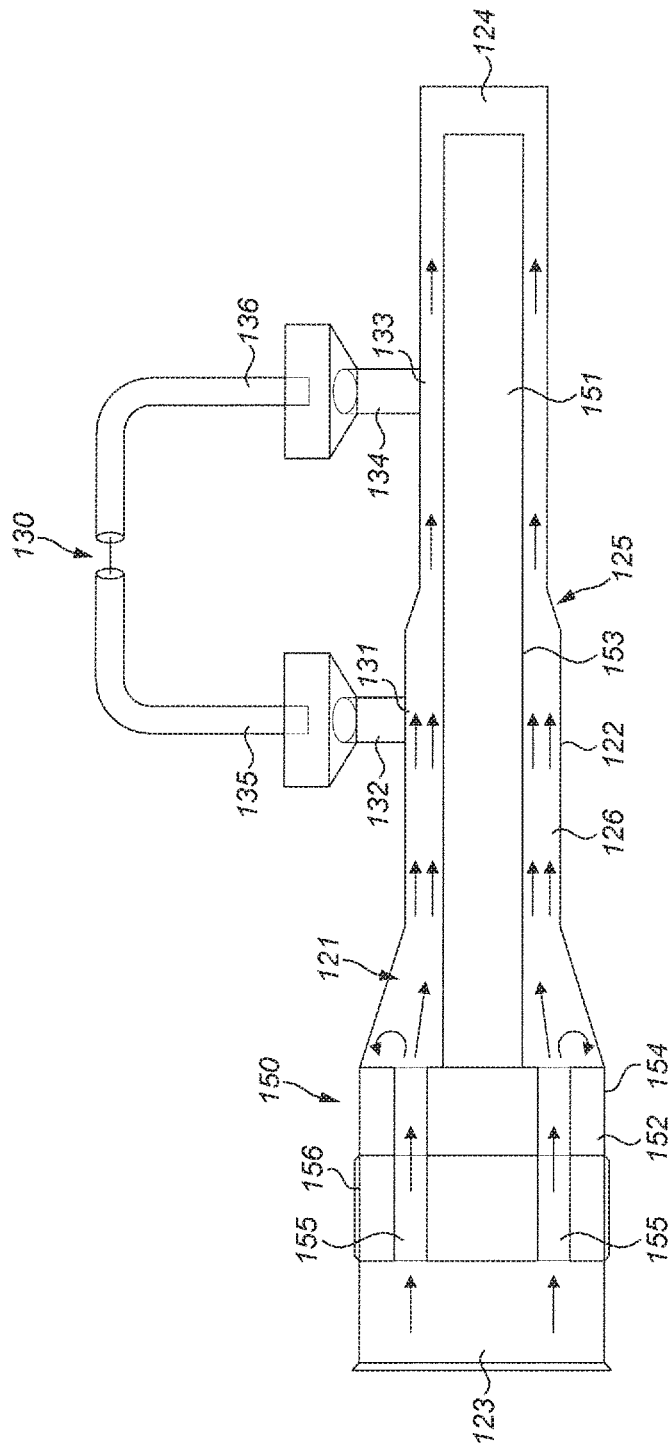
FIG. 6 is a schematic cross-section of the fluid sensing apparatus of the mass flow controller of FIGS. 1 to 4, showing fluid flow through the apparatus.

As best seen in FIG. 6, fluid sensor 130 is in fluid communication with a first location 131 of the fluid flow channel 121 upstream of the flow restriction 125 via a first fluid conduit 132 and with a second location 133 of the fluid flow channel 121 downstream of the flow restriction 125 by a second fluid conduit 134. However, in other examples, the fluid sensor may be in fluid communication with only a single location of the fluid flow channel. The fluid sensor 130 is configured to generate a sensor signal indicative of the flow rate of fluid passing along the fluid flow channel 121 so that the control electronics 105 can control the fluid control valve 104 accordingly to achieve a desired flow rate through the mass flow controller 100.

In this example, the fluid sensor 130 is a pressure sensor and comprises a first sensor port 135 which is positioned in the first fluid conduit 132 and a second sensor port 136 which is positioned in the second fluid conduit 134. The first and second sensor ports 135, 136 each provide an opening by which fluid can enter and/or exit a casing 137 of the fluid sensor 130. The first sensor port 135 enables the fluid sensor 130 to sense or measure a first fluid pressure P1 at the first location 131 and the second sensor port 136 enables the fluid sensor 130 to sense or measure a second fluid pressure P2 at the second location 133. The first and second sensor ports 135 and 136 extend into the first and second fluid conduits 132 and 134, respectively. An O-ring 138 is provided around each of the first and second sensor ports 135 and 136 to form a resilient seal between the first and second sensor ports 135, 136 and the first and second fluid conduits 132 and 134, respectively, to prevent fluid leakage.

As a result of the flow restriction 125, the flow velocity at the second location 133 tends to be higher than the flow velocity at the first location. Consequently, the second fluid pressure P2 tends to be lower than the first fluid pressure P1. From the sensed values of P1 and P2, the pressure difference ΔP across the flow restriction 125 can be calculated and the flow rate through the fluid flow channel 121 determined based on the principle that the flow rate of a fluid through a flow restriction is proportional to the pressure difference across the flow restriction. The pressure difference ΔP may be determined by the fluid sensor 130 or by the control electronics 105. Where the pressure difference ΔP is determined by the control electronics, the sensor signal may comprise a first pressure signal of the first fluid pressure P1 over time and a second pressure signal of the second fluid pressure P2 over time. Where the pressure difference ΔP is determined by the fluid sensor, the sensor signal may comprise from a pressure difference signal of the pressure difference ΔP over time. The fluid sensor may be configured to determine the flow rate, in which case the sensor signal may comprise a flow rate signal.

In other examples, the fluid sensor 130 may be a mass flow sensor. For example, the first and second fluid conduit 132 and 134 may be connected to form a bypass channel (not shown) around which a portion of the fluid flow is diverted by the flow restriction 125, wherein the fluid sensor is configured to measure a bypass flow rate around the bypass channel. The fluid flow rate along the fluid flow channel may then be calculated from the bypass flow rate.

Figure 3:
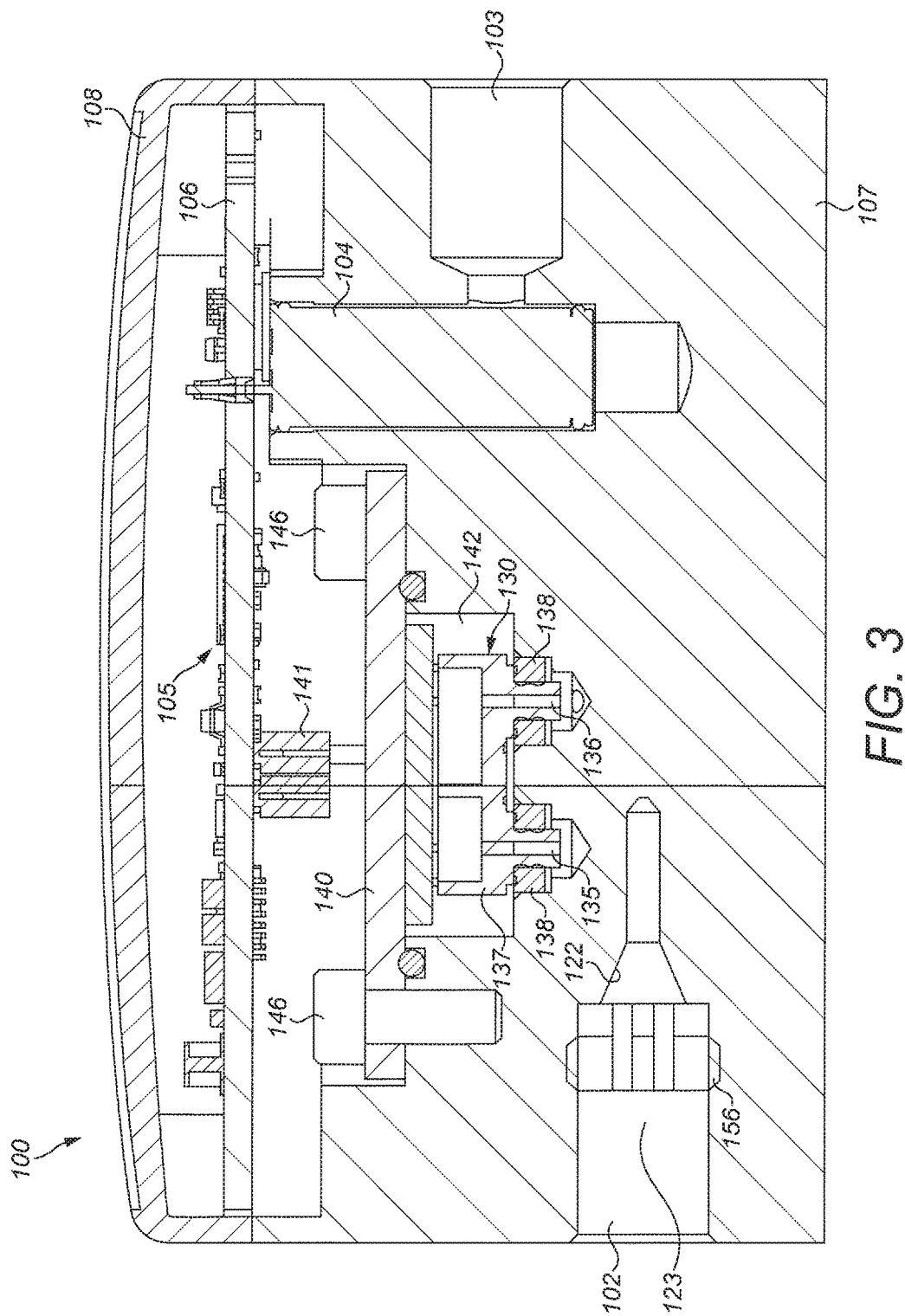
FIG. 3 is a section view taken through line III-III in FIG. 2.
Figure 4:
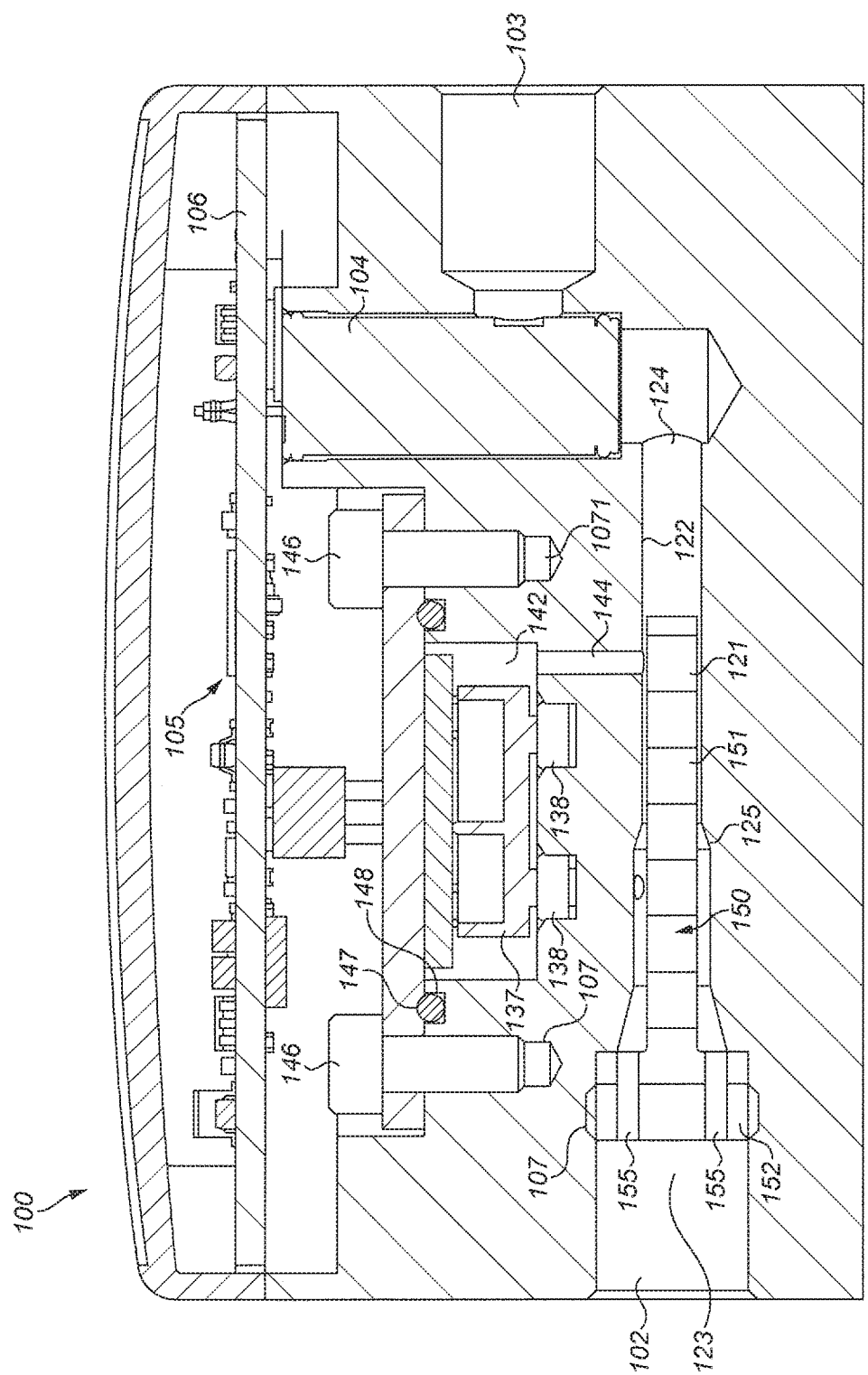
FIG. 4 is a section view taken through line IV-IV in FIG. 2.
Figure 5:
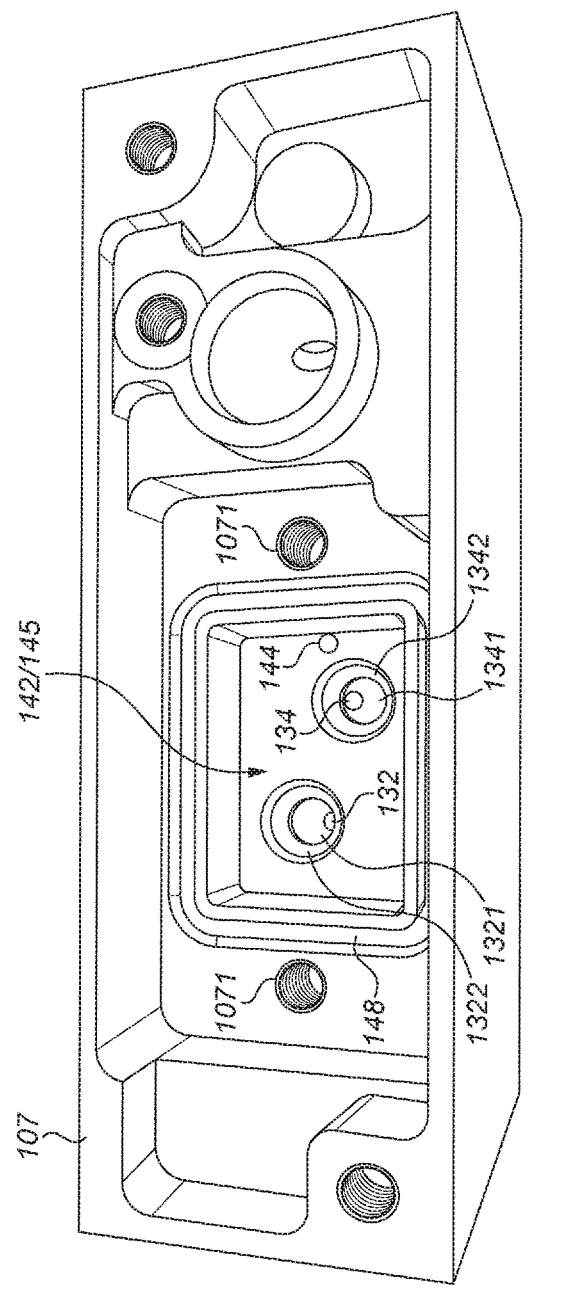
FIG. 5 is a top perspective view of the solid body of the mass flow controller of FIGS. 1 to 4.

As best seen in FIGS. 3 to 5, the solid body 107 is formed from a solid block of material in which a plurality of bores are defined to form the various conduits and by which other components of the mass flow controller 100 are accommodated. The fluid sensing apparatus 120 further includes a pressure compensation chamber 142 which is in fluid communication with a third location 143 along the fluid flow channel 121 via a pressure compensation conduit 144. The pressure compensation chamber 142 is defined by a receptacle in the form of a cavity 145 in the outer surface of the solid body 107, and by the auxiliary printed circuit board 140 which closes the cavity 145. The auxiliary printed circuit board 140 is held in position against the cavity 145 by a pair of screws 146 which extend into threaded bores 1071 in the solid body 107. The auxiliary printed circuit board 140 is sealed against the cavity 145 by a resilient seal 147 which sits in a continuous groove 148 formed in the outer surface of the solid body 107 and extending around the cavity 145. The resilient seal 147 prevents fluid leakage between the auxiliary printed circuit board 140 and the solid body 107. In this manner, the auxiliary printed circuit board 140 forms an upper wall of the pressure compensation chamber 142. Thus, the underside of the auxiliary printed circuit board 140, on which the fluid sensor 130 is mounted, is exposed to elevated pressures in the pressure compensation chamber 142, while the upper side of the auxiliary printed circuit board 140 is exposed to atmospheric pressure. This means that the auxiliary printed circuit board should be constructed to withstand the difference between atmospheric pressure and the elevated pressures in the pressure compensation chamber 142 during operation. However, it also means that components of the mass flow controller which are situated above the auxiliary printed circuit board 140, such as the main printed circuit board 106 are at atmospheric pressure and need not be constructed to withstand elevated pressures. The first fluid conduit 132, the second fluid conduit 134, and the pressure compensation conduit 144 extend to the base of the cavity 145. The pressure compensation conduit is open to the pressure compensation chamber. The first and second fluid conduits 132 and 134 each have a cup-shaped receptacle 1321, 1341 at their cavity ends and a seal seat 1322, 1324 around the cup-shaped receptacle 1321, 1341 in which the O-ring around each sensor port is seated to isolate the first and second fluid conduits from the pressure compensation chamber.

In this example, the third location 143, from which the pressure compensation conduit 144 extends, is downstream of both the first and second locations 131, 133, from which the first and second fluid conduits 132, 134 extend. However, in other examples, the pressure compensation conduit 144 may be connected to a different location along the fluid flow channel 121, for example a location upstream of one or both of the first and second locations 131, 133.

To improve flow sensing accuracy, the fluid sensing apparatus 120 further includes an optional laminar flow element 150 located in the fluid flow channel 121. The laminar flow element 150 comprises a stabilisation rod 151 and a support by 152 by which the stabilisation rod 121 is mounted centrally in the fluid flow channel 121. The stabilisation rod 151 extends along the fluid flow channel 121 through the flow restriction 125 at least from the first location 131 to the second location 133 to encourage laminar flow and supress turbulence in the fluid flow channel 121. In this example, the stabilisation rod 151 extends from a position upstream of the first location 131 to a position downstream of the second location 133. The support 152 of the laminar flow element 150 is secured within the fluid flow channel 121 at the upstream end of the stabilisation rod 151. The support 152 may be fixedly secured in the flow channel 151, or removably secured. In this example, the support 152 comprises a screw thread 156 on its outer surface 154 which engages with a corresponding screw thread on the outer wall 122 of the flow channel 121. Thus, the support 152 is removably secured within the flow channel 121 by a threaded connection at a position upstream of the first location 131.

The support 152 of the laminar flow element 150 includes a plurality of fluid flow apertures 155 which are spaced at regular intervals around the circumference of the support 152 and space from the outer surface 154 of the support. The fluid flow apertures 155 allow fluid to pass through the support 152 and encourage more uniform fluid flow along the fluid flow channel 121. The support 152 may have any suitable shape. In this example, the outer surface 154 of the support 152 corresponds in shape to the outer wall 122 of the flow channel 121 and is secured by a threaded connection. This prevents or reduces the amount of fluid which is able to pass between the outer surface 154 of the support 152 and the outer wall 122 of the flow channel 121. Since the outer surface 154 corresponds in shape to the outer wall 122 of the flow channel 121, substantially all of the fluid flowing along the fluid flow channel flows through the fluid flow apertures 155. In other examples, one or more outer apertures may be formed between the outer surface of the support and the outer wall of the flow channel so that fluid may pass around the outer surface of the support.

As best seen in FIG. 6, the outer wall 122 of the fluid flow channel 121 and the outer surface 153 of the stabilisation rod 151 together define an annular portion 126 of the fluid flow channel 121 through which fluid flows. The outer surface 153 of the flow stabilisation rod 151 is substantially continuous. That is, the outer surface 153 of the flow stabilisation rod 151 is substantially free of any grooves, protrusions, or other surface features which might otherwise discourage flow attachment. The outer surface 153 of the stabilisation rod 151 may be smooth. In this example, the diameter of the outer surface 153 is substantially constant along the entire length of the stabilisation rod 151. Thus, the cross-sectional area of the annular portion 126, which varies with the radial distance between the outer wall 122 of the fluid flow channel 121 and the outer surface 153 of the flow stabilisation rod 151, decreases across the flow restriction purely as a function of the decrease in the diameter of the outer wall 122 of the flow channel 121. In other examples, the diameter of the outer surface 153 may vary along the length of the stabilisation rod 151. The diameter of the outer surface 153 may increase or decrease along its length, provided the radial distance between the outer wall 122 of the fluid flow channel 121 and the outer surface 153 of the flow stabilisation rod 151 is reduced to define the flow restriction. In examples where the diameter of the outer surface of the flow stabilisation rod increases, the diameter of the outer wall of the flow channel may decrease, stay the same, or increase in the region of the flow restriction, provided the increase in the diameter of the outer surface of the flow stabilisation rod is sufficient that the radial distance between the outer wall of the fluid flow channel and the outer surface of the flow stabilisation rod is still reduced across the flow restriction.

During operation of the mass flow controller 100, fluid enters the housing 101 through fluid inlet 102 and enters into the fluid flow channel 121 via the channel inlet 123. When the fluid reaches the laminar flow element 150 it passes through the plurality of fluid flow apertures 155 in the support 152 and enters the annular portion 126 of the fluid flow channel 121 defined between the stabilisation rod 151 and the outer wall 122 of the fluid flow channel 121 where it travels along the length of the stabilisation rod 151, through the flow restriction 125 and out of the fluid flow channel 121 at the channel outlet 124. Fluid enters the casing 137 of the fluid sensor 130 via the first and second fluid conduits 132, 134. The fluid sensor 130 monitors the first fluid pressure P1 at the first location 131 and the second fluid pressure P2 at the second location 133 and outputs the sensed values of P1 and P2 as a sensor signal to the control electronics 105. The control electronics 105 determines the pressure drop ΔP across the flow restriction 125 by subtracting P2 from P1. Based on the pressure drop ΔP, the control electronics 105 calculates the flow rate through the fluid flow channel 121 and compares this to the desired flow rate in a conventional manner. If the calculated flow rate is more than or less than the desired flow rate, the control electronics 105 then controls the fluid control valve 104 to adjust the flow rate as required. As the pressure compensation chamber 142 is in fluid communication with the fluid flow channel via the pressure compensation conduit 144, the pressure compensation chamber 142 is filled with fluid at the same pressure P3 as the third location 143 along the fluid flow channel 121. With this arrangement, the outer surface of the casing 137 of the fluid sensor 130 is exposed to an elevated pressure which varies with pressure P3 in the fluid flowing along the flow channel 121 at the third location 143. At the same time, the inner surface of the casing 137 is exposed to elevated pressures which vary with the pressures P1, P2 in the fluid flowing along the flow channel 121 at the first and second locations 131 and 133. This means that the casing of the fluid sensor need only resist the relatively small difference between the pressure P3 at the third location and the first and second pressures P1, P2 at the first and second locations, rather than the full difference between atmospheric pressure and the first and second fluid pressures P1 and P2.

By enclosing the casing 137 of the fluid sensor 130 within the pressure compensation chamber 142, the outer surface of the casing 137 is exposed to fluid pressures which are comparable to the fluid pressure inside the casing 137. Thus, the pressure differential across the casing 137 is small. This means that the casing 137 need not be constructed to withstand large internal pressures, since these will be matched by large external pressures. Consequently, the complexity, size, and weight of the fluid sensor may be reduced relative to conventional fluid sensing apparatuses. In fact, with the arrangement of the present invention, it may be possible to use a fluid sensor having a casing which can withstand a pressure differential of only 1 bar or less.

Figure 7:
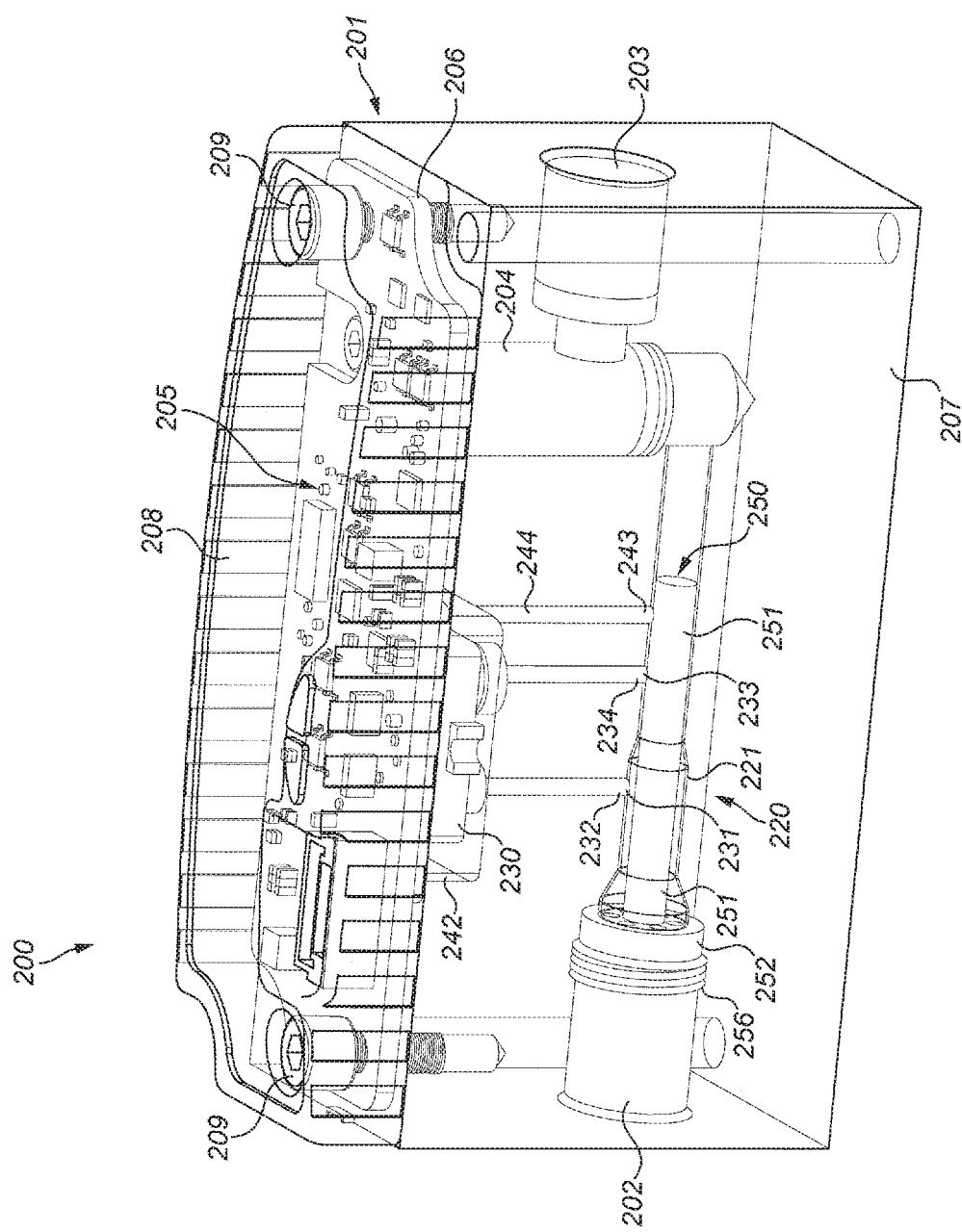
FIG. 7 is a perspective partial section view of a mass flow controller including a fluid sensing apparatus according to a second embodiment.

FIG. 7 shows a second embodiment of mass flow controller 200 including a fluid sensing apparatus 220 according to a second embodiment of the invention. The mass flow controller 200 has a similar structure and function to the mass flow controller 100 of the first embodiment and similar reference numerals are used to denote similar features. As with the first embodiment, the fluid sensing apparatus 220 includes a laminar flow element 250 having a flow stabilisation rod 251 positioned centrally in the fluid flow channel 221 and extending from a position upstream of the first location 231 to a position downstream of the second location 233. The mass flow controller 200 also includes control electronics 205 mounted on a PCB 206. However, unlike the first embodiment, the fluid sensor 230 is mounted directly on the main PCB 206, along with the control electronics 205. Thus the main PCB 206 is the sole PCB in the mass flow controller 200. In the absence of an auxiliary printed circuit board, the main PCB 206 forms an upper wall of the pressure compensation chamber 242, is held in position by a pair of screws 209 which extend into threaded bores in the solid body 207, and is sealed against the solid body 207 by a resilient seal (not shown). Thus, the underside of the main PCB 206 is exposed to the elevated pressures in the pressure compensation chamber 242, while the upper side of the main PCB 206 is exposed to atmospheric pressure. This means that the main PCB 206 should be constructed to withstand the difference between atmospheric pressure and the elevated pressures in the pressure compensation chamber 242 during operation.

Further, in the mass flow controller 200 of the second embodiment, the third location 243 from which the pressure compensation conduit 244 extends is upstream of both of the first and second locations 231, 233, rather than downstream.

Although the invention has been described above with reference to one or more preferred embodiments, it will be appreciated that various changes or modifications may be made without departing from the scope of the invention as defined in the appended claims.

The invention claimed is:

1. A fluid sensing apparatus comprising:
a fluid flow channel having an inlet and an outlet;
at least one fluid conduit in fluid communication with the fluid flow channel;
a fluid sensor configured to output a sensor signal, the fluid sensor having a casing and at least one sensor port in fluid communication with the at least one fluid conduit and providing access into the casing;
a pressure compensation chamber in which the casing of the fluid sensor is enclosed, wherein the fluid sensor is mounted on a printed circuit board which forms part of the pressure compensation chamber; and
at least one pressure compensation conduit in fluid communication with the pressure compensation chamber and with the fluid flow channel,
wherein the at least one fluid conduit extends between the at least one sensor port and a location along the fluid flow channel such that fluid flowing along the fluid flow channel at the location of the at least one fluid conduit during use enters the casing of the fluid sensor via the at least one fluid conduit, and
wherein the at least one pressure compensation conduit extends between the pressure compensation chamber and a location along the fluid flow channel such that fluid flowing along the fluid flow channel at the location of the at least one pressure compensation conduit during use enters the pressure compensation chamber via the at least one pressure compensation conduit such that a fluid pressure in the pressure compensation chamber compensates for an internal fluid pressure within the casing.

2. The fluid sensing apparatus of claim 1, wherein the pressure compensation chamber further comprises a receptacle against which the printed circuit board is sealed to close the receptacle and thereby define the pressure compensation chamber.

3. The fluid sensing apparatus of claim 2, further comprising a resilient seal between the printed circuit board and the receptacle, wherein the printed circuit board is removably sealed against the receptacle by the resilient seal.

4. The fluid sensing apparatus of claim 2, further comprising a housing including a solid body in which the at least one fluid conduit and the at least one pressure compensation conduit are formed, wherein the receptacle is defined by a cavity in the solid body.

5. The fluid sensing apparatus of claim 1, wherein the printed circuit board is a main printed circuit board on which control electronics and the fluid sensor are mounted.

6. The fluid sensing apparatus of claim 1, wherein the printed circuit board is an auxiliary printed circuit board and the fluid sensing apparatus further comprises a main printed circuit board on which control electronics are mounted, the main printed circuit board being electrically connected to the auxiliary printed circuit board by one or more electrical connectors.

7. The fluid sensing apparatus of claim 1, further comprising a sensor seal between the at least one sensor port and the at least one fluid conduit, wherein the at least one fluid conduit is isolated from the pressure compensation chamber by the sensor seal.

8. The fluid sensing apparatus of claim 1, wherein the at least one fluid conduit comprises a first fluid conduit extending from a first location along the fluid flow channel, and a second fluid conduit extending from a second location along the fluid flow channel, and wherein the at least one sensor port comprises a first sensor port in fluid communication with the first fluid conduit and a second sensor port in fluid communication with the second fluid conduit.

9. The fluid sensing apparatus of claim 8, wherein the fluid flow channel comprises a flow restrictor disposed between the first and second locations and wherein the fluid sensor is configured to measure a first pressure in the first fluid conduit and to measure a second first pressure in the second fluid conduit.

10. The fluid sensing apparatus of claim 9, wherein the first fluid conduit, the sensor casing, and the second fluid conduit together form a bypass channel along which a portion of fluid flow along the fluid flow channel is diverted during use, and wherein the fluid sensor is configured to measure a bypass flow rate through the bypass channel.

11. The fluid sensing apparatus of claim 1, wherein the fluid flow channel is surrounded and defined by an outer wall of the fluid flow channel, and wherein the at least one pressure compensation conduit and the at least one fluid conduit extend through the outer wall of the fluid flow channel.

12. The fluid sensing apparatus claim 1, wherein the at least one pressure compensation conduit extends between the pressure compensation chamber and the location along the fluid flow channel such that a portion of the fluid flowing along the fluid flow channel at the location of the at least one pressure compensation conduit during use enters the pressure compensation chamber via the at least one pressure compensation conduit.

13. The fluid sensing apparatus of claim 1, wherein the at least one fluid conduit extends between the at least one sensor port and the location along the fluid flow channel such that a portion of the fluid flowing along the fluid flow channel at the location of the at least one fluid conduit during use enters the casing of the fluid sensor via the at least one fluid conduit.

14. The fluid sensing apparatus of claim 1, wherein the pressure compensation chamber is remote from the fluid flow channel.

15. The fluid sensing apparatus of claim 1, wherein a portion of the fluid flowing along the fluid flow channel at the location of the at least one pressure compensation conduit during use is diverted from the fluid flow channel to enter the pressure compensation chamber via the at least one pressure compensation conduit.

16. The fluid sensing apparatus of claim 1, wherein a portion of the fluid flowing along the fluid flow channel at the location of the at least one fluid conduit during use is diverted from the fluid flow channel to enter the casing of the fluid sensor via the at least one fluid conduit.

17. The fluid sensing apparatus of claim 1, wherein the at least one pressure compensation conduit extends between the pressure compensation chamber and at least one location along the length of the fluid flow channel between the inlet and the outlet.

18. The fluid sensing apparatus of claim 1, wherein the at least one fluid conduit extends between the at least one sensor port and at least one location along the length of the fluid flow channel between the inlet and the outlet.

19. A mass flow controller comprising:
a fluid control valve;
control electronics; and
a fluid sensing apparatus according to claim 1,
wherein the control electronics is configured to control the fluid control valve based on a sensor signal provided by the fluid sensing apparatus.

20. The mass flow controller of claim 19, wherein the fluid sensing apparatus further comprises:
a main printed circuit board on which the control electronics are mounted; and
an auxiliary printed circuit board on which the fluid sensor is mounted and which forms part of the pressure compensation chamber,
wherein the main printed circuit board is spaced from the auxiliary printed circuit board in a direction perpendicular to the plane of the auxiliary printed circuit board and is electrically connected to the auxiliary printed circuit board by one or more electrical connectors.

21. The mass flow controller of claim 19, wherein the mass flow controller is a miniature mass flow controller.

* * * * *